United States Patent
Hou et al.

(10) Patent No.: US 11,265,036 B2
(45) Date of Patent: Mar. 1, 2022

(54) SELF-TUNING METHOD, SELF-TUNING SYSTEM AND MOBILE TERMINAL

(71) Applicant: ONEPLUS TECHNOLOGY (SHENZHEN) CO., LTD., Shenzhen (CN)

(72) Inventors: Jianzhang Hou, Shenzhen (CN); Changwen Zhou, Shenzhen (CN)

(73) Assignee: ONEPLUS TECHNOLOGY (SHENZHEN) CO., LTD., Shenzhen (CN)

(*) Notice: Subject to any disclaimer, the term of this patent is extended or adjusted under 35 U.S.C. 154(b) by 57 days.

(21) Appl. No.: 16/869,270

(22) Filed: May 7, 2020

(65) Prior Publication Data
US 2020/0266849 A1    Aug. 20, 2020

Related U.S. Application Data

(63) Continuation of application No. PCT/CN2018/114408, filed on Nov. 7, 2018.

(30) Foreign Application Priority Data

Nov. 13, 2017   (CN) .......................... 201711115376.7

(51) Int. Cl.
*H04B 1/40* (2015.01)
*H01Q 1/24* (2006.01)
*H04L 25/02* (2006.01)

(52) U.S. Cl.
CPC .............. *H04B 1/40* (2013.01); *H01Q 1/243* (2013.01); *H04L 25/0278* (2013.01)

(58) Field of Classification Search
CPC ...... H04B 1/40; H04B 1/0458; H04B 17/103; H04B 1/0064; H04B 1/18; H04B 1/44;
(Continued)

(56) References Cited

U.S. PATENT DOCUMENTS 7,865,154 B2 * 1/2011 Mendolia .................. H03F 3/60
                                                                455/125
9,362,966 B1 * 6/2016 Matsumoto .......... H04B 7/0871
(Continued)

FOREIGN PATENT DOCUMENTS

CN    102098243 A    6/2011
CN    102122932 A    7/2011
(Continued)

OTHER PUBLICATIONS

Bertoluzzo, M., & Buja, G., Frequency tuning in inductive power transfer systems, 2020, Electronics, vol. 9(3), pp. 527, doi:http://dx.doi.org/10.3390/electronics9030527 (Year: 2020).*
(Continued)

*Primary Examiner* — Lana N Le
(74) *Attorney, Agent, or Firm* — Syncoda LLC; Feng Ma

(57) ABSTRACT

A self-tuning method can be applied to a self-tuning system and a mobile terminal. In the method, an actual performance index value of the self-tuning system in a current use environment is acquired; when it is determined that a difference between the actual performance index value and a preset performance index value in a current use environment is greater than a preset value, the self-tuning system is controlled to perform tuning until the self-tuning system finishes the tuning of all states thereof, so as to obtain a reflection signal corresponding to each of the states; each reflected signal is compared with a radio frequency signal received by the self-tuning system respectively, so as to obtain a comparison result; and a tuning parameter, within a first preset range, corresponding to the comparison result is determined as the tuning parameter of the self-tuning system in the current use environment.

7 Claims, 10 Drawing Sheets

(58) Field of Classification Search
CPC .......... H04B 2001/1072; H04B 7/0413; H04B 17/12; H04B 17/19; H04B 1/04; H04B 1/16; H04B 1/3827; H04B 1/48; H01Q 1/243; H01Q 5/335; H01Q 15/148; H01Q 1/2291; H01Q 1/241; H01Q 23/00; H01Q 3/28; H04L 25/0278
See application file for complete search history.

(56) References Cited

U.S. PATENT DOCUMENTS

| | | | | |
|---|---|---|---|---|
| 9,614,524 | B1* | 4/2017 | Kawasaki | H01J 37/32165 |
| 9,671,765 | B2* | 6/2017 | Manssen | H04B 1/0458 |
| 10,418,717 | B2* | 9/2019 | Johnsson | H01Q 19/027 |
| 10,673,514 | B1* | 6/2020 | Klomsdorf | H04B 7/04 |
| 2005/0184922 | A1* | 8/2005 | Ida | H04B 1/0458 343/861 |
| 2006/0281423 | A1 | 12/2006 | Caimi | |
| 2009/0237170 | A1 | 9/2009 | Van Zyl | |
| 2012/0258675 | A1* | 10/2012 | Itkin | H04B 1/0458 455/115.1 |
| 2014/0051477 | A1 | 2/2014 | Zhang | |
| 2014/0120849 | A1* | 5/2014 | Peltonen | H04B 17/12 455/77 |
| 2014/0167878 | A1 | 6/2014 | Lee | |
| 2014/0256325 | A1 | 9/2014 | Hoirup | |
| 2014/0349593 | A1 | 11/2014 | Danak et al. | |
| 2015/0072740 | A1* | 3/2015 | Gupta | H03F 3/191 455/571 |
| 2016/0126619 | A1 | 5/2016 | Tenbroek et al. | |
| 2017/0353956 | A1 | 12/2017 | Hoirup | |
| 2018/0076524 | A1* | 3/2018 | O'Driscoll | H01Q 1/273 |
| 2018/0159222 | A1* | 6/2018 | Backes | H01Q 5/335 |
| 2019/0115899 | A1* | 4/2019 | Pajona | H04B 1/006 |
| 2019/0260111 | A1* | 8/2019 | Muthuswamy | H04R 1/1016 |
| 2020/0169331 | A1* | 5/2020 | Kim | H04B 17/103 |
| 2020/0212862 | A1* | 7/2020 | Hulsteijn | H04B 1/1607 |

FOREIGN PATENT DOCUMENTS

| | | | |
|---|---|---|---|
| CN | 102122969 A | 7/2011 | |
| CN | 102638280 A | 8/2012 | |
| CN | 103546600 A | 1/2014 | |
| CN | 103580648 A | 2/2014 | |
| CN | 103858341 A | 6/2014 | |
| CN | 103926850 A | 7/2014 | |
| CN | 105680886 A | 6/2016 | |
| CN | 105743518 A | 7/2016 | |
| CN | 106299609 A | 1/2017 | |
| CN | 106301603 A | 1/2017 | |
| CN | 106973408 A | 7/2017 | |
| CN | 107342460 A | 11/2017 | |
| CN | 108199742 A | 6/2018 | |
| EP | 2465205 A2 * | 6/2012 | .......... H04B 1/0458 |
| EP | 2395673 B1 * | 2/2014 | .......... H04B 1/0458 |
| EP | 2806585 A1 | 11/2014 | |
| EP | 3016289 A1 * | 5/2016 | .............. H01Q 5/50 |
| WO | 02056460 A2 | 7/2002 | |
| WO | 2003047035 A1 | 6/2003 | |
| WO | 2013022826 A1 | 2/2013 | |
| WO | 2018206093 A1 | 11/2018 | |

OTHER PUBLICATIONS

International Search Report in the international application No. PCT/CN2018/114408, dated Jan. 30, 2019.
English Translation of the Written Opinion of the International Search Authority in the international application No. PCT/CN2018/114408, dated Jan. 30, 2019.
Notice of Allowance of the Chinese application No. 201711115376.7, dated Aug. 31, 2020.
Supplementary European Search Report in the European application No. 18875120.0, dated Jun. 23, 2021.
Office Action of the Indian application No. 202017021117, dated Jun. 28, 2021.

* cited by examiner

SELF-TUNING METHOD, SELF-TUNING SYSTEM AND MOBILE TERMINAL

CROSS-REFERENCE TO RELATED APPLICATION

This application is a continuation of International Patent Application No. PCT/CN2018/114408 filed on Nov. 7, 2018, which claims priority to Chinese patent application No. 201711115376.7, filed to the Patent Office of the People's Republic of China on Nov. 13, 2017, entitled "SELF-TUNING METHOD, SELF-TUNING SYSTEM AND MOBILE TERMINAL," the disclosures of which are hereby incorporated by reference in its entirety.

BACKGROUND

An antenna, as a converter, converts a guided wave propagated in a transmission line into an electromagnetic wave which is propagated in a free space, or executes inverse conversion, and the antenna is a component in a radio device and configured to transmit or receive an electromagnetic wave. Therefore, a mobile terminal for information transmission is undoubtedly provided with an antenna. However, since a mobile terminal may be used in various environments and a surrounding of the mobile terminal also varies anytime, signal reception and signal transmission of an antenna is greatly influenced. According to a conventional solution, an antenna of a mobile terminal is usually provided with an aperture switch for tuning, but it is still difficult to keep high transmission and reception performance of the antenna in various environments.

SUMMARY

The disclosure relates to the technical field of antennae, and particularly to a self-tuning method, a self-tuning system and a mobile terminal.

A self-tuning method is provided, which may be applied to a self-tuning system and include the following operations.

An actual performance index value of the self-tuning system in a present usage environment is acquired.

Responsive to determining that a difference value between the actual performance index value and a preset performance index value in the present usage environment is greater than a preset value, the self-tuning system is controlled to perform tuning until the self-tuning system tunes all states of the self-tuning system to obtain a reflected state corresponding to each state.

Each reflected signal is compared with a radio frequency signal received by the self-tuning system to obtain a comparison result.

A tuning parameter corresponding to the comparison result within a first preset range is determined as a tuning parameter of the self-tuning system in the present usage environment.

In at least some embodiments, the self-tuning system may include a frequency matching module and an impedance matching module.

In at least some embodiments, responsive to determining that the difference value between the actual performance index value and the preset performance index value in the present usage environment is greater than the preset value, the frequency matching module may be controlled for frequency regulation, the impedance matching module may be controlled for impedance regulation until the frequency matching module regulates all frequencies of the frequency matching module and the impedance matching module regulates impedance corresponding to each of the frequencies and a reflected signal corresponding to each of the frequencies may be obtained.

In at least some embodiments, the tuning parameter matched by the self-tuning system may include the frequency matched by the frequency matching module and the impedance matched by the impedance matching module.

In at least some embodiments, the comparison result may include a Voltage Standing Wave Ratio (VSWR) and a signal-to-noise ratio.

A self-tuning system is provided, which may include a first acquisition module, a tuning control module, a second acquisition module and a tuning determination module.

The first acquisition module may be configured to acquire an actual performance index value of the self-tuning system in a present usage environment.

The tuning control module may be configured to responsive to determining that a difference value between the actual performance index value and a preset performance index value in the present usage environment is greater than a preset value, control the self-tuning system to perform tuning until the self-tuning system tunes all states of the self-tuning system to obtain a reflected state corresponding to each state.

The second acquisition module may be configured to compare each reflected signal and a radio frequency signal received by the self-tuning system to obtain a comparison result.

The tuning determination module may be configured to determine a tuning parameter corresponding to the comparison result within a first preset range as a tuning parameter of the self-tuning system in the present usage environment.

In at least some embodiments, the self-tuning system may include a frequency matching module and an impedance matching module.

In at least some embodiments, the tuning control module may further be configured to, responsive to determining that the difference value between the actual performance index value and the preset performance index value in the present usage environment is greater than the preset value, control the frequency matching module to perform frequency regulation, control the impedance matching module controlled for impedance regulation and, when the frequency matching module regulates all frequencies of the frequency matching module and the impedance matching module regulates impedance corresponding to each of the frequencies, obtain a reflected signal corresponding to each of the frequencies.

In at least some embodiments, the tuning parameter matched by the self-tuning system may include the frequency matched by the frequency matching module and the impedance matched by the impedance matching module.

A mobile terminal is provided, which may use the self-tuning method.

A non-transitory computer-readable storage medium is provided, which may store a computer instruction, the computer instruction enabling a computer to execute the self-tuning method of the application.

A computer program product is provided, which may include a computer program stored in a non-transitory computer-readable storage medium, the computer program including a program instruction and the program instruction being executed by a computer to enable the computer to execute the self-tuning method of the application.

BRIEF DESCRIPTION OF THE DRAWINGS

In order to describe the technical solutions in the embodiments of the application or a conventional art more clearly, the drawings required to be used in descriptions about the embodiments or the conventional art will be simply introduced below. It is apparent that the drawings described below are only some embodiments of the disclosure. Drawings of other embodiments may further be obtained by those of ordinary skill in the art according to these drawings without creative work.

DETAILED DESCRIPTION

For better understanding the disclosure, the disclosure will be described more comprehensively below with reference to the related drawings. The drawings illustrate preferred embodiments of the disclosure. However, the disclosure may be implemented in various forms and is not limited to the embodiments described herein. Instead, these embodiments are provided to make the contents disclosed in the disclosure understood more thoroughly and comprehensively.

Unless otherwise defined, all technological and scientific terms used herein have meanings the same as those usually understood by those skilled in the art of the disclosure. Herein, terms used in the description of the disclosure are only adopted to describe specific embodiments and not intended to limit the disclosure. Term "and/or" used herein includes one or any and all combinations of multiple related items which are listed.

Figure 1:
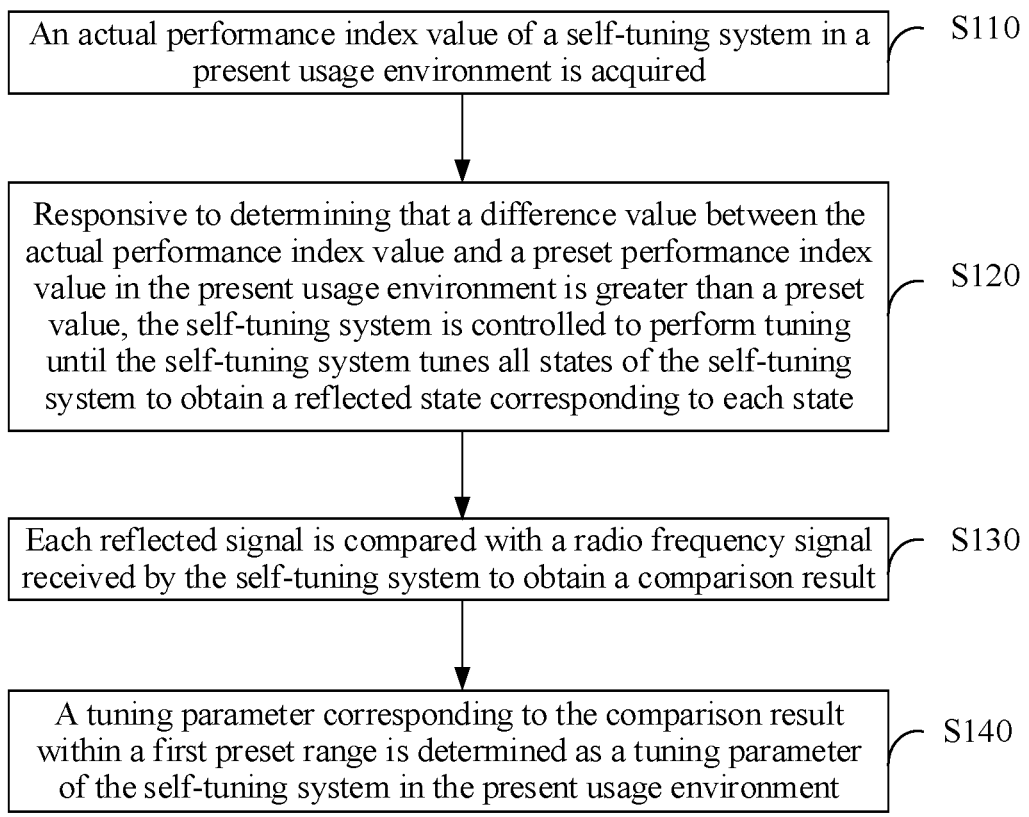
FIG. 1 is a flowchart of a self-tuning method according to an implementation.

Referring to FIG. 1, an implementation provides a self-tuning method. The self-tuning method is applied to a self-tuning system. When a usage environment changes, adaptive tuning may be implemented according to the environment to keep high transmission and reception performance of the self-tuning system. The method includes the following steps.

In S110, an actual performance index value of the self-tuning system in a present usage environment is acquired.

The actual performance index value may be a performance parameter such as a VSWR, signal-to-noise ratio or impedance of the self-tuning system. The usage environment may be a usage scenario of holding and the like. Specifically, when the self-tuning system is in different usage environments, a resonance point of the self-tuning system is at different positions in a Smith chart. When the self-tuning system is in a certain usage environment, a mismatch sensor tracks a running condition of the self-tuning system and feeds back impedance information under the running condition in real time.

In S120, responsive to determining that a difference value between the actual performance index value and a preset performance index value in the present usage environment is greater than a preset value, the self-tuning system is controlled to perform tuning until the self-tuning system tunes all states of the self-tuning system to obtain a reflected state corresponding to each state.

Specifically, the preset value may be determined according to an actual condition. When the self-tuning system is in a certain usage environment, a position of the impedance information of the self-tuning system in Smith chart information is compared, and when a difference between the impedance information is greater than a preset value, a tuning function of the self-tuning system is turned on. During this period, the self-tuning system tunes all the states of the self-tuning system and obtains the reflected signal corresponding to each state.

In S130, each reflected signal is compared with a radio frequency signal received by the self-tuning system to obtain a comparison result.

Specifically, each reflected signal is compared with the radio frequency signal received by the self-tuning system one by one to obtain the corresponding comparison result.

In S140, a tuning parameter corresponding to the comparison result within a first preset range is determined as a tuning parameter of the self-tuning system in the present usage environment.

Specifically, the tuning parameter corresponding to the comparison result in the first preset range and matched by the self-tuning system is determined as an optimal tuning parameter according to magnitudes of the comparison results, and in such case, transmission and reception performance of the self-tuning system is best.

Through the self-tuning method, adaptive tuning may be implemented according to the environment of the self-tuning system, thereby keeping high transmission and reception performance of the self-tuning system.

In at least some embodiments, the self-tuning system includes a frequency matching module and an impedance matching module. In at least some embodiments, the frequency matching module may be, for example, a circuit consisting of inductors, resistors or capacitors, and impedance matching module may be, for example, another circuit consisting of inductors, resistors, or capacitors. However, it is to be understood that these are only some examples for the frequency matching module and impedance matching module, and the frequency matching module may be any device which can perform frequency matching, and the impedance matching module may be any device which can perform impedance matching.

Specifically, the frequency matching module is configured to perform frequency regulation to match a frequency of the self-tuning system and a frequency of the radio frequency signal. The impedance matching module is configured to perform impedance regulation to match an impedance of the self-tuning system and an impedance of the radio frequency signal.

In at least some embodiments, responsive to determining that the difference value between the actual performance index value and the preset performance index value in the present usage environment is greater than the preset value, the frequency matching module is controlled for frequency regulation, the impedance matching module is controlled for impedance regulation until the frequency matching module regulates all frequencies of the frequency matching module and the impedance matching module regulates impedance corresponding to each of the frequencies and a reflected signal corresponding to each of the frequencies is obtained.

Specifically, when the self-tuning system is in a certain usage environment, a position of the impedance of the self-tuning system in the Smith chart is compared, and when a difference therebetween is greater than a preset value, the frequency matching module regulates its own frequency and the impedance matching module regulates its own impedance until the frequency matching module and the impedance matching module regulate all the frequency and impedance states thereof, each frequency corresponding to all the impedances regulated by the impedance matching module, to obtain the corresponding reflected signal.

In at least some embodiments, the tuning parameter matched by the self-tuning system includes the frequency matched by the frequency matching module and the impedance matched by the impedance matching module.

In at least some embodiments, the comparison result includes a VSWR and a signal-to-noise ratio. In an antenna system, impedance mismatch of an antenna and a feed line or impedance mismatch of the antenna and a transmitter may cause generation of a reflected signal in the antenna, and an incident signal and the reflected signal converge to generate a standing wave. A calculation formula for the VSWR is $VSWR=R/r=(1+K)/(1-K)$, where a reflection coefficient is $K=(R-r)/(R+r)$, K indicates an opposite phase when being a negative value, and R and r represents an output impedance and an input impedance respectively. When numerical values of the two impedances are the same, namely perfect match is implemented, the reflection coefficient K is equal to 0, and the VSWR is 1. This is an ideal condition. There is always a reflected signal in practice, so the VSWR is always greater than 1. Therefore, the VSWR is usually taken as a basis for radiation efficiency of the antenna, and if the VSWR is lower, it is indicated that there are fewer reflected signals and the radiation efficiency of the antenna is higher. In addition, a parametric ratio may also be another performance parameter capable of reflecting the radiation efficiency of the antenna.

According to the self-tuning method, the actual performance index value of the self-tuning system in the present usage environment is acquired at first; then, responsive to determining that the difference value between the actual performance index value and the preset performance index value in the present usage environment is greater than the preset value, the self-tuning system is controlled to perform tuning until the self-tuning system tunes all the states of the self-tuning system to obtain the reflected signal corresponding to each state; next, each reflected signal is compared with the radio frequency signal received by the self-tuning system to obtain the comparison result; and finally, the tuning parameter corresponding to the comparison result in the first preset range is determined as the tuning parameter of the self-tuning system. Through the self-tuning method, adaptive tuning may be implemented according to an environment of a self-tuned antenna, thereby keeping high transmission and reception performance of the self-tuning system.

Figure 2:
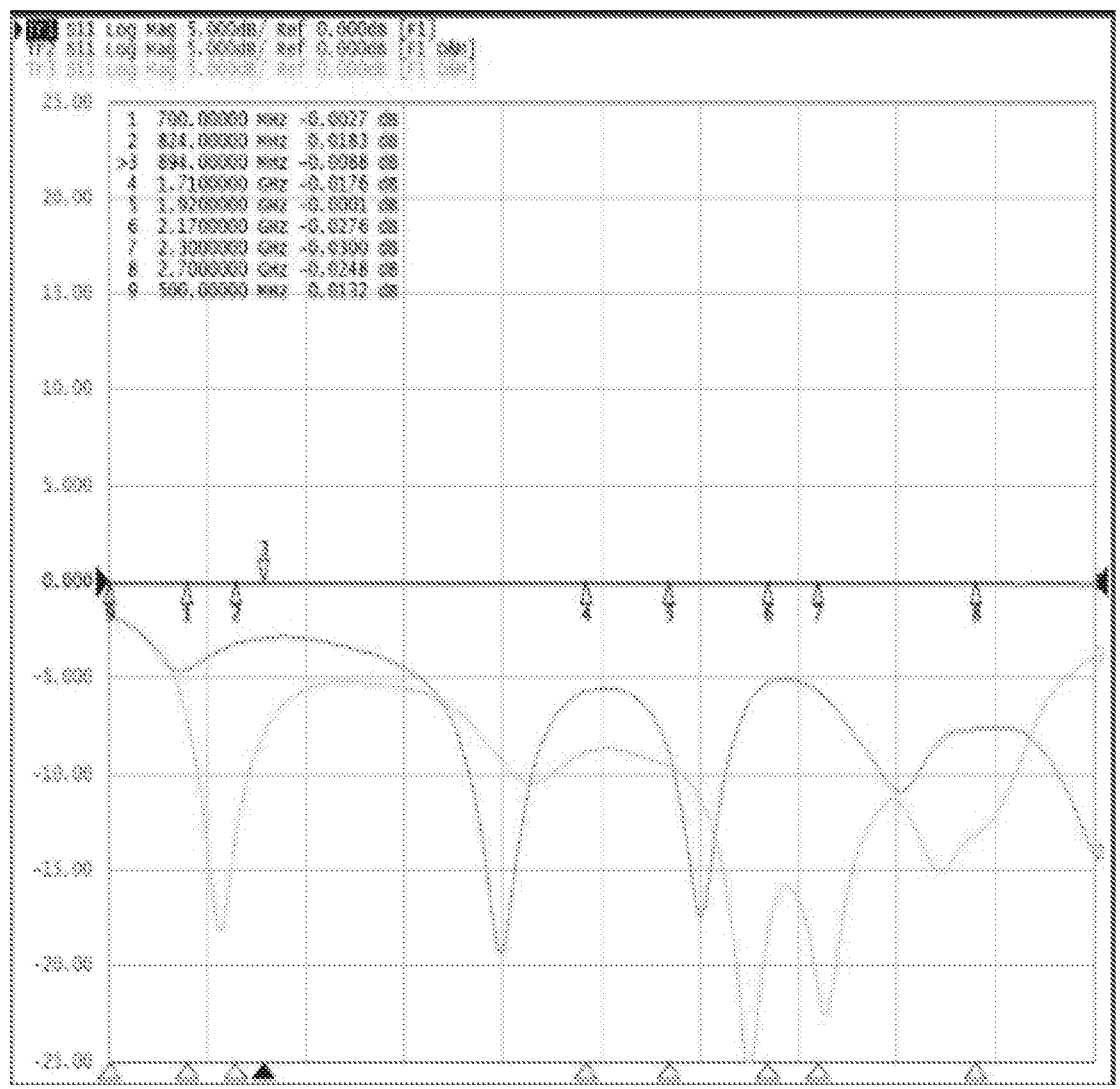
FIG. 2 is a frequency response comparison diagram of according to an embodiment of a self-tuning system according to the implementation illustrated in FIG. 1.

Referring to FIG. 2, when the self-tuning method is adopted, in a frequency response comparison diagram, the abscissa axis is the frequency taking MHz as a unit, and the ordinate axis is a return loss characteristic parameter (S11) taking dB as a unit. The figure shows a standing wave comparison condition of the self-tuning system before and after the impedance matching module 300 and frequency matching module 400a of the self-tuning system are started in a range of 700 MHZ-900 MHZ. It can be seen that, when the impedance matching module 300 and frequency matching module 400a of the self-tuning system are adapted, performance of the self-tuning system may be improved by at least 4 dB and may be improved by at most about 15 dB.

Figure 3:
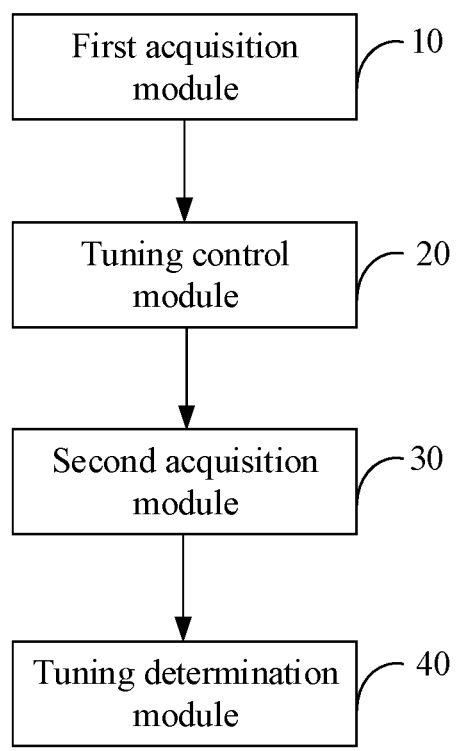
FIG. 3 is a structural diagram of a self-tuning system according to an implementation.

Referring to FIG. 3, another implementation provides a self-tuning system, which includes a first acquisition module 10, a tuning control module 20, a second acquisition module 30 and a tuning determination module 40.

In at least some embodiments, the first acquisition module 10, tuning control module 20, second acquisition module 30, and tuning determination module 40 may be implemented by one or more processors or microprocessors or any other processing circuits. The processor(s) or microprocessor(s) or any other processing circuit(s) may execute instructions stored in for example a memory to perform operations to implement function of the modules.

The first acquisition module 10 is configured to acquire an actual performance index value of the self-tuning system in a present usage environment.

The tuning control module 20 is configured to responsive to determining that a difference value between the actual performance index value and a preset performance index value in the present usage environment is greater than a preset value, control the self-tuning system to perform tuning until the self-tuning system tunes all states of the self-tuning system to obtain a reflected state corresponding to each state.

The second acquisition module 30 is configured to compare each reflected signal and a radio frequency signal received by the self-tuning system to obtain a comparison result.

The tuning determination module 40 is configured to determine a tuning parameter corresponding to the comparison result within a first preset range as a tuning parameter of the self-tuning system in the present usage environment.

In at least some embodiments, the self-tuning system includes a frequency matching module and an impedance matching module.

In at least some embodiments, the tuning control module 20 is further configured to, responsive to determining that the difference value between the actual performance index value and the preset performance index value in the present usage environment is greater than the preset value, control the frequency matching module to perform frequency regulation, control the impedance matching module to perform impedance regulation and, when the frequency matching module regulates all frequencies of the frequency matching module and the impedance matching module regulates impedance corresponding to each of the frequencies, obtain a reflected signal corresponding to each of the frequencies.

In at least some embodiments, the tuning parameter matched by the self-tuning system includes the frequency matched by the frequency matching module and the impedance matched by the impedance matching module.

Another implementation provides a mobile terminal, which uses the self-tuning method.

Figure 4:
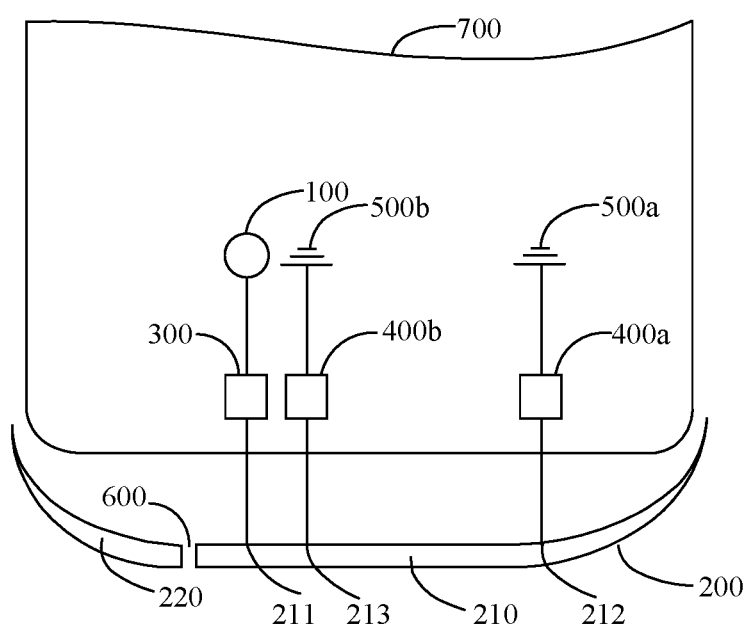
FIG. 4 is a structural diagram of a mobile terminal according to an implementation.

Specifically, referring to FIG. 4, the mobile terminal includes a back shell 700, and an antenna feed source 100, an impedance matching module 300, a first frequency matching module 400a, a first grounding terminal 600a and a second grounding terminal 500b are all positioned on the back shell 700. A connection terminal 211, a second connection terminal 212 and a third connection terminal 213 are positioned on a radiator 200. When there is an antenna slot between the back shell 700 and the radiator 200, the radiator 200 and the back shell 700 may be connected into an integrated body by use of a nanometer injection molding process, and in addition, any one of a glass material, a metal material and a ceramic material, etc. may be adopted for the back shell 700. In addition, the antenna slot may be a "C"-shaped slot or a straight slot, a width of the antenna slot is 0.1 mm to 3 mm, and the antenna slot is usually filled with a medium. When there is no antenna slot between the back shell 700 and the radiator 200, any one of the glass material and the ceramic material, etc. may be adopted for the back shell 700, and the radiator 200 surrounds the back shell 700 using a metal frame.

In addition, the self-tuning system may be a self-tuned antenna. For convenient description, detailed descriptions are made in the disclosure with the self-tuned antenna as an example.

Figure 5:
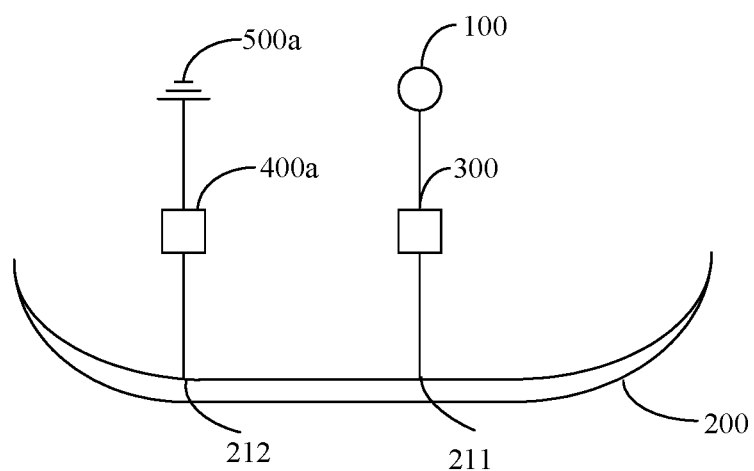
FIG. 5 is a structural diagram of an embodiment of a self-tuned antenna according to the implementation illustrated in FIG. 3.

Referring to FIG. 5, the self-tuned antenna includes an antenna feed source 100, a radiator 200, an impedance matching module 300 and a first frequency matching module 400a. The self-tuned antenna is further provided with a first grounding terminal 500a.

In the implementation, the antenna feed source 100, the impedance matching module 300 and the radiator 200 are electrically connected in sequence, a joint of the impedance matching module 300 and the radiator 200 is a first connection terminal 211, the radiator 200, the first frequency matching module 400a and the first grounding terminal 500a are electrically connected in sequence, and a joint of the first frequency matching module 400a and the radiator 200 is a second connection terminal 212. A position of the first connection terminal 211 is different from a position of the second connection terminal 212. Specifically, the antenna feed source 100 is configured to provide input power for the self-tuned antenna. The impedance matching module 300 is configured to regulate an impedance of the self-tuned antenna. The first frequency matching module 400a is configured to regulate a frequency of the self-tuned antenna.

The antenna feed source 100, the impedance matching module 300 and the first connection terminal 211 on the radiator 200 are sequentially connected into a first branch circuit, the second connection terminal 212 on the radiator 200, the first frequency matching module 400a and a second grounding terminal are sequentially connected into a second branch circuit, the first branch circuit, the radiator 200 and the second branch circuit are sequentially connected into a first inverted "F" antenna that is transversely arranged, and an opening of "F" faces the antenna feed source 100. For example, the antenna feed source 100 sends a radio frequency signal, the impedance matching module 300 performs regulation according to an input impedance of the antenna feed source 100 to match the impedance of the self-tuned antenna and the input impedance of the antenna feed source 100, and the first frequency matching module 400a performs regulation according to a frequency of the radio frequency signal to match a working frequency of the self-tuned antenna and a resonance frequency, so that a reflected signal is reduced, and the self-tuned antenna is further endowed with relatively high radiation efficiency. In addition, when a distance between the position of the first connection terminal 211 of the first inverted "F" antenna and one side of a long edge of the radiator 200 is 23 mm and a distance between the position of the second connection terminal 212 and the other side of the long edge of the radiator 200 is 20 mm (one side of the long edge of the radiator 200 is opposite to the other side of the long edge of the radiator 200), the first inverted "F" antenna may generate a low frequency.

According to the self-tuned antenna, the first frequency matching module 400a is connected between the first grounding terminal 500a and the radiator 200a, the impedance matching module 300 is connected between the antenna feed source 100 and the radiator 200, the frequency of the self-tuned antenna is regulated to be matched with the resonance frequency through the first frequency matching module 400a, and the impedance of the self-tuned antenna is regulated to be matched with a target impedance through the impedance matching module 300, so that a VSWR of the radio frequency signal and the reflected signal is minimized, and furthermore, the self-tuned antenna may be adaptively tuned according to an actual condition when an environment changes to further keep high transmission and reception performance.

Figure 6:
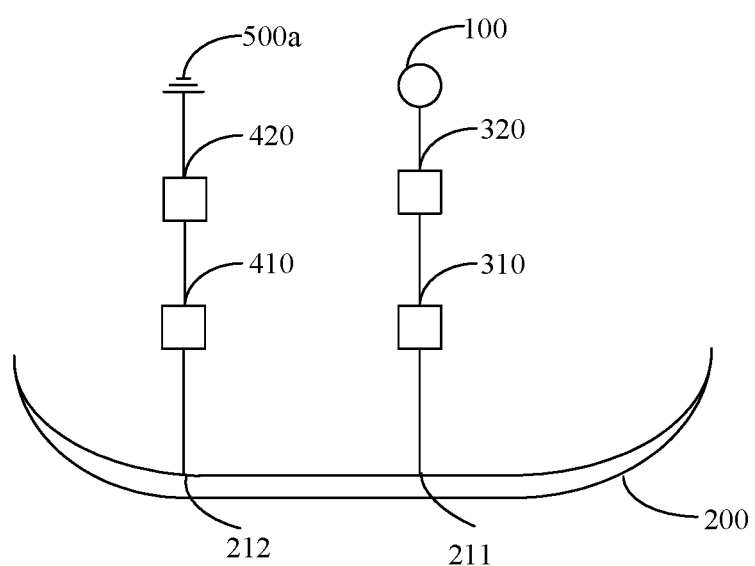
FIG. 6 is a structural diagram of an embodiment of an impedance matching module and frequency matching module of a self-tuned antenna according to the implementation illustrated in FIG. 3.

In at least some embodiments, referring to FIG. 6, the impedance matching module 300 includes a tunable unit 310. The tunable unit 310 is connected between the antenna feed source 100 and the radiator 200, and is configured to regulate the impedance of the self-tuned antenna. The antenna feed source 100, the tunable unit 310 and the first connection terminal 211 on the radiator 200 are sequentially connected into the first branch circuit, the second connection terminal 212 on the radiator 200, the first frequency matching module 400a and the second grounding terminal are sequentially connected into the second branch circuit, the first branch circuit, the radiator 200 and the second branch circuit are sequentially connected into the first inverted "F" antenna that is transversely arranged, and the opening of "F" faces the antenna feed source 100. The tunable unit 310 is configured to regulate its own impedance to match an impedance of the first inverted "F" antenna and the target impedance of the self-tuned antenna.

Furthermore, the impedance matching module 300 further includes a first matching unit 320. The first matching unit 320 is connected between the antenna feed source 100 and the tunable unit 310, and is configured to regulate the self-tuned antenna to resonate with the radio frequency signal transmitted by the antenna feed source. Specifically, the antenna feed source 100, the matching unit 320, the tunable unit 310 and the first connection terminal 211 on the radiator 200 are sequentially connected into the first branch circuit, the second connection terminal 212 on the radiator 200, the first frequency matching module 400a and the second grounding terminal are sequentially connected into the second branch circuit, the first branch circuit, the radiator 200 and the second branch circuit are sequentially connected into the first inverted "F" antenna that is transversely arranged, and the opening of "F" faces the antenna feed source 100. The first matching unit 320 is configured to coordinate the self-tuned antenna to enable the self-tuned antenna to resonate with external signals of more bands to work in multiple bands better. Specifically, the first matching unit 320 may be an adjustable capacitor, and capacitance of the adjustable capacitor may be regulated to enable the self-tuned antenna to work in multiple bands.

In at least some embodiments, still referring to FIG. 6, the first frequency matching module 400a includes an aperture switch unit 410. The aperture switch unit 410 is connected between the radiator 200 and the first grounding terminal 500a, and is configured to regulate the frequency of the self-tuned antenna. Specifically, the antenna feed source 100, the impedance matching module 300 and the first connection terminal 211 on the radiator 200 are sequentially connected into the first branch circuit, the second connection terminal 212 on the radiator 200, the aperture switch unit 410 and the first grounding terminal 500a are sequentially connected into the second branch circuit, the first branch circuit, the radiator 200 and the second branch circuit are sequentially connected into the first inverted "F" antenna that is transversely arranged, and the opening of "F" faces the antenna feed source 100. The aperture switch unit 410 is configured to regulate its own frequency to match a frequency of the first inverted "F" antenna and the frequency of the radio frequency signal. The aperture switch unit 410 may be a variable capacitor with a high Q value, and when the frequency of the radio frequency signal changes, a load of the variable capacitor may also be regulated to match the frequency of the first inverted "F" antenna and the frequency of the radio frequency signal.

Furthermore, the first frequency matching module 400a further includes a second matching unit 420. The second matching unit 420 is connected between the aperture switch unit 410 and the first grounding terminal 500a, and is configured to regulate the self-tuned antenna to resonate with the radio frequency signal transmitted by the antenna feed source. Specifically, the second matching unit 420 may be an adjustable capacitor, and capacitance of the adjustable capacitor may be regulated to enable the self-tuned antenna to resonate with external signals of more bands for information reception or transmission to work in multiple bands better.

Figure 7:
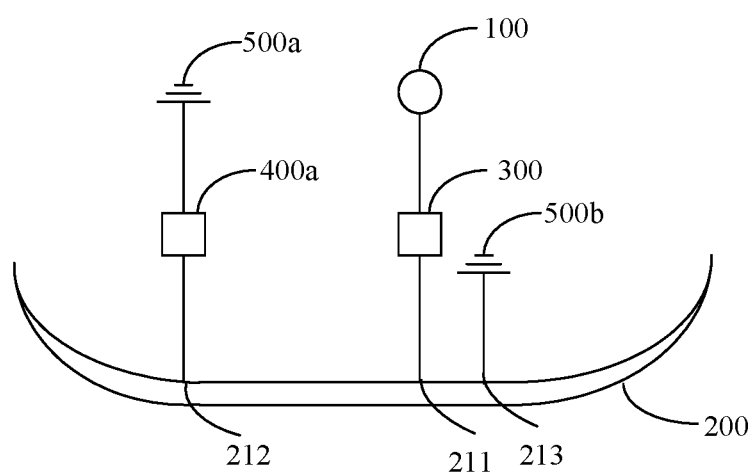
FIG. 7 is a structural diagram of an embodiment of a second inverted "F" antenna in a self-tuned antenna according to the implementation illustrated in FIG. 3.

In at least some embodiments, referring to FIG. 7, the self-tuned antenna is further provided with a second grounding terminal 500b. The radiator 200 is electrically connected with the second grounding terminal 500b, a joint of the radiator 200 and the second grounding terminal 500b is a third connection terminal 213, and a position of the third connection terminal 213 is different from the position of the first connection terminal 211 and the position of the second connection terminal 212.

The antenna feed source 100, the impedance matching module 300 and the first connection terminal 211 on the radiator 200 are sequentially connected into a third branch circuit, the third connection terminal 213 on the radiator 200 and the second grounding terminal 500b are sequentially connected into a fourth branch circuit, the third branch circuit, the radiator 200 and the fourth branch circuit are sequentially connected into a second inverted "F" antenna that is transversely arranged, and an opening of "F" faces the antenna feed source 100. Specifically, a distance between the position of the first connection terminal 211 of the second inverted "F" antenna and one side of the long edge of the radiator 200 is 23 mm, a distance between the position of the third connection terminal 213 and the position of the first connection terminal 211 is 4 mm, and the position of the third connection terminal 213 is on a right side of the position of the first connection terminal 211. Therefore, the second inverted "F" antenna may generate an intermediate frequency, and the working frequency of the self-tuned antenna is further extended. In another embodiment, the distance between the position of the first connection terminal 211 of the second inverted "F" antenna and one side of the long edge of the radiator 200 is 23 mm, the position of the third connection terminal 211 is on the right side of the position of the first connection terminal 211 and is at a distance of 3.5 mm far away from the position of the first connection terminal 211, and the second inverted "F" antenna may still generate the intermediate frequency.

Figure 8:
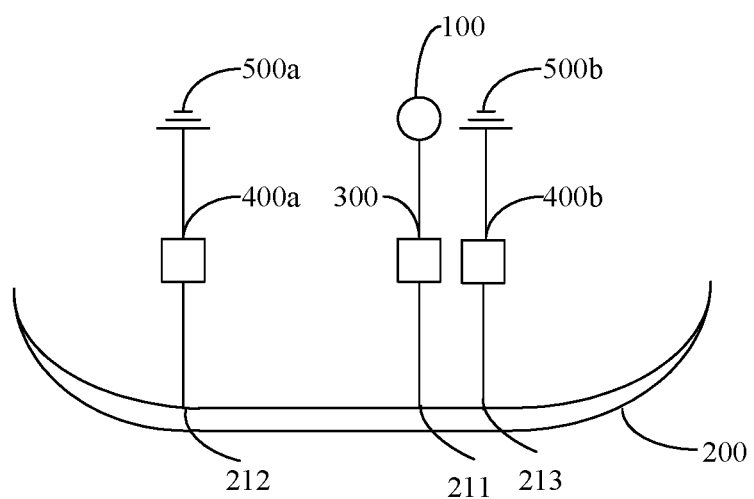
FIG. 8 is a structural diagram of an embodiment of a second inverted "F" antenna with a tuning function according to the implementation illustrated in FIG. 3.

In at least some embodiments, referring to FIG. 8, the self-tuned antenna further includes a second frequency matching module 400b. The second frequency matching module 400b is connected between the radiator 200 and the second grounding terminal 500b. Specifically, the antenna feed source 100, the impedance matching module 300 and the first connection terminal 211 on the radiator 200 are sequentially connected into the third branch circuit, the third connection terminal 213 on the radiator 200, the second frequency matching module 400b and the second grounding terminal 500b are sequentially connected into the fourth branch circuit, the third branch circuit, the radiator 200 and the fourth branch circuit are sequentially connected into the second inverted "F" antenna that is transversely arranged, and the opening of "F" faces the antenna feed source 100. Due to connection of the second frequency matching module 400b, the second inverted "F" antenna may not also implement impedance regulation for matching with the input impedance of the antenna feed source 100 but also implement regulation in an intermediate frequency range according to the environment to keep high transmission and reception performance of the self-tuned antenna in the intermediate frequency range.

Figure 9:
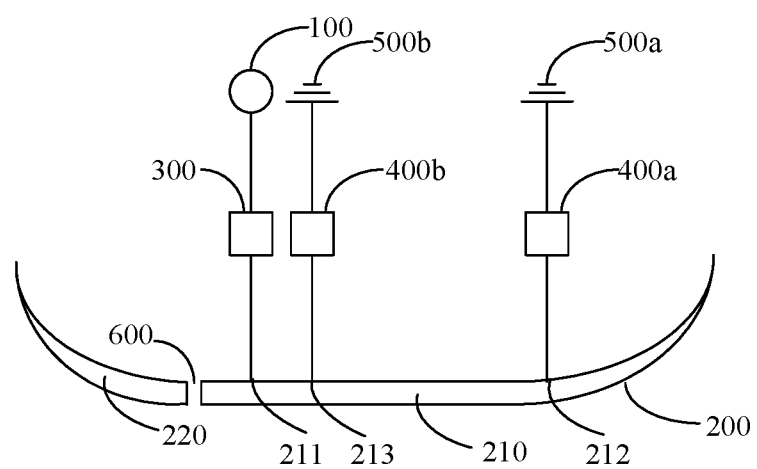
FIG. 9 is a structural diagram of an embodiment of a self-tuned antenna with a coupling slot according to the implementation illustrated in FIG. 3.

In at least some embodiments, referring to FIG. 9, the radiator 200 has a coupling slot 600. A width of the coupling slot 600 is 0.2 mm to 2.0 mm. Specifically, the width of the coupling slot 600 is 0.6 mm, and a distance between a center of the coupling slot 600 and a left side edge of the radiator 200 is 16 mm. In another embodiment, the width of the coupling slot may be 0.2 mm.

The coupling slot 600 divides the radiator 200 into a first radiation unit 210 and a second radiation unit 220, and an area of the first radiation unit 210 is larger than an area of the second radiation unit 220. The first connection terminal 211 and the second connection terminal 212 are positioned at the second radiation unit 220. Specifically, energy provided for the first radiation unit 210 by the antenna feed source 100 may be coupled to the second radiation unit 220 through the coupling slot 600, thereby forming a new radiation electromagnetic wave to achieve a band extension purpose. For example, the first inverted "F" antenna may generate the low frequency, and after coupling through the coupling slot 600, the first inverted "F" antenna may work in high and low frequency ranges. The second inverted "F" antenna may generate the intermediate frequency, and after coupling through the coupling slot 600, the second inverted "F" antenna may work in the high and intermediate frequency ranges. The self-tuned antenna includes the first inverted "F" antenna and the second inverted "F" antenna, so that the self-tuned antenna may work in the low, intermediate and high frequency ranges. Therefore, the energy provided for the first radiation unit by the antenna feed source 100 may be coupled to the second radiation unit through the coupling slot 600 to generate a high frequency to enable the self-tuned antenna to work normally at the high frequency. The working frequency of the self-tuned antenna may further be extended, so that all bands required by a Long Term Evolution (LTE) technology may be covered.

Figure 10:
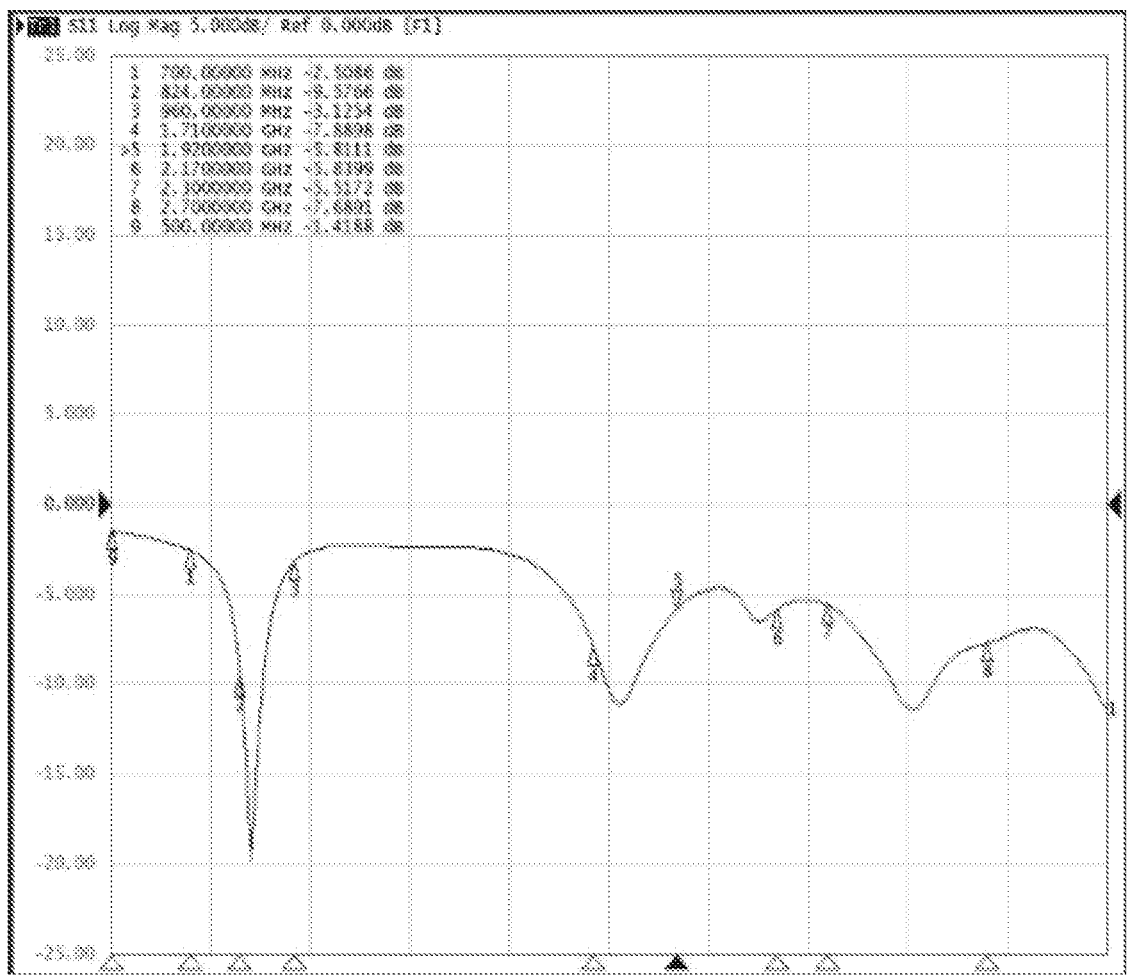
FIG. 10 is a frequency response diagram of an embodiment of a self-tuned antenna according to the implementation illustrated in FIG. 3.

Referring to FIG. 10, in a frequency response diagram of the self-tuned antenna, the abscissa axis is the frequency taking MHz as a unit, and the ordinate axis is a parameter S11 (a return loss characteristic) taking dB as a unit. It can be seen from the figure that the self-tuned antenna has a good broadband characteristic when the first frequency matching module 400a and the impedance matching module 300 are not regulated. The first frequency matching module 400a and the impedance matching module 300 may be regulated to enable a mobile terminal to support six modes, 34 bands and more than two hundreds of carrier aggregation combinations and simultaneously achieve ideal radiation efficiency of the self-tuned antenna in each band to keep high transmission and reception performance of the self-tuned in each band.

In addition, the self-tuned antenna is externally connected with a mismatch sensor. The mismatch sensor tracks a running condition of the self-tuned antenna, provides a feedback value reflecting an actual condition of the self-tuned antenna, such as a VSWR, a signal-to-noise ratio and Smith chart information, and obtains an actual performance index value of the self-tuned antenna and an ideal performance index value by comparison, and if a difference is greater than a preset value, the mismatch sensor controls and regulates the first frequency matching module 400*a* and the impedance matching module 300 in the usage environment in real time. Specifically, the actual performance index value is numerical information such as the VSWR, signal-to-noise ratio and impedance of the self-tuned antenna under the actual condition, and the ideal performance index value is numerical information such as a target VSWR, a target signal-to-noise ratio and a target impedance of the self-tuned antenna when the radiation efficiency is best.

Specifically, when the environment of the self-tuned antenna changes, a position of the self-tuned antenna in a Smith chart also changes. Therefore, when the self-tuned antenna is in a certain usage environment, the mismatch sensor tracks the running condition of the self-tuned antenna, provides Smith chart information in the usage environment and compares the impedance of the self-tuned antenna and the target impedance to obtain a difference value, and when the difference value is greater than the preset value, the usage environment of the self-tuned antenna may be recognized, and the impedance matching module 300 and the first frequency matching module 400*a* in the usage environment are started. Then, the mismatch sensor controls the aperture switch unit 410 of the self-tuned antenna to be rapidly switched to a write-head state to match the frequency of the self-tuned antenna and the frequency of the radio frequency signal. Meanwhile, the mismatch sensor controls the tunable unit 310 to perform impedance regulation and compares the VSWR of the radio frequency signal and reflected signal of the self-tuned antenna, time for each operation being very short. The operations are repeated to automatically traverse all states of the tunable unit 310 in the self-tuned antenna, and the state corresponding to the minimum VSWR is found as a state that the self-tuned antenna has best transmission and reception performance.

A non-transitory computer-readable storage medium is provided, which stores a computer instruction, the computer instruction enabling a computer to execute the self-tuning method of the disclosure.

A computer program product is provided, which includes a computer program stored in a non-transitory computer-readable storage medium, the computer program including a program instruction and the program instruction being executed by a computer to enable the computer to execute the self-tuning method of the disclosure.

Each technical feature of the above embodiments may be freely combined. For brief description, not all possible combinations of each technical feature in the abovementioned embodiments are described, but all the combinations of these technical features shall fall within the scope recorded in the description without conflicts.

The abovementioned embodiments only describe some implementations of the disclosure and are specifically described in detail and not thus understood as limitations to the patent scope of the disclosure. It is to be pointed out that those of ordinary skill in the art may further make a plurality of transformations and improvements without departing from the concept of the disclosure and all of these fall within the scope of protection of the disclosure. Therefore, the scope of patent protection of the disclosure should be salient object to the appended claims.

What is claimed is:

1. A self-tuning method, applied to a self-tuning system and comprising:
   acquiring an actual performance index value of the self-tuning system in a present usage environment, wherein the self-tuning system comprises a frequency matching module and an impedance matching module;
   responsive to determining that a difference value between the actual performance index value and a preset performance index value in the present usage environment is greater than a preset value, controlling the frequency matching module to perform frequency regulation, controlling the impedance matching module to perform impedance regulation until the frequency matching module regulates all frequencies of the frequency to each of the frequencies, to obtain a reflected signal corresponding to each of the frequencies;
   comparing each reflected signal and a radio frequency signal received by the self-tuning system to obtain a comparison result; and
   determining a tuning parameter corresponding to the comparison result within a first preset range as a tuning parameter of the self-tuning system in the present usage environment.

2. The self-tuning method of claim 1, wherein the tuning parameter matched by the self-tuning system comprises:
   the frequency matched by the frequency matching module and the impedance matched by the impedance matching module.

3. The self-tuning method of claim 1, wherein the comparison result comprises a Voltage Standing Wave Ratio (VSWR) and a signal-to-noise ratio.

4. A self-tuning system, comprising:
   a first acquisition module, configured to acquire an actual performance index value of the self-tuning system in a present usage environment;
   a frequency matching module;
   an impedance matching module;
   a tuning control module, configured to, responsive to determining that a difference value between the actual performance index value and a preset performance index value in the present usage environment is greater than a preset value, control the frequency matching module to perform frequency regulation, control the impedance matching module to perform impedance regulation until the frequency matching module regulates all frequencies of the frequency matching module and the impedance matching module regulates impedance corresponding to each of the frequencies, to obtain a reflected signal corresponding to each of the frequencies;
   a second acquisition module, configured to compare each reflected signal and a radio frequency signal received by the self-tuning system to obtain a comparison result; and
   a tuning determination module, configured to determine a tuning parameter corresponding to the comparison result within a first preset range as a tuning parameter of the self-tuning system in the present usage environment.

5. The self-tuning system of claim 4, wherein the tuning parameter matched by the self-tuning system comprises:
the frequency matched by the frequency matching module and the impedance matched by the impedance matching module.

6. A mobile terminal, comprising:
a first acquisition module, configured to acquire an actual performance index value of the self-tuning system in a present usage environment;
a frequency matching module;
an impedance matching module;
a tuning control module, configured to, responsive to determining that a difference value between the actual performance index value and a preset performance index value in the present usage environment is greater than a preset value, control the frequency matching module to perform frequency regulation, control the impedance matching module to perform impedance regulation until the frequency matching module regulates all frequencies of the frequency matching module and the impedance matching module regulates impedance corresponding to each of the frequencies, to obtain a reflected signal corresponding to each of the frequencies;
a second acquisition module, configured to compare each reflected signal and a radio frequency signal received by the self-tuning system to obtain a comparison result; and
a tuning determination module, configured to determine a tuning parameter corresponding to the comparison result within a first preset range as a tuning parameter of the self-tuning system in the present usage environment.

7. The mobile terminal of claim 6, wherein the tuning parameter matched by the self-tuning system comprises:
the frequency matched by the frequency matching module and the impedance matched by the impedance matching module.

* * * * *